United States Patent
Mogna et al.

(10) Patent No.: US 11,178,880 B2
(45) Date of Patent: Nov. 23, 2021

(54) PRODUCTION OF A YEAST-FREE, HIGHLY DIGESTIBLE PIZZA BY USING A DOUGH CONTAINING LACTIC ACID BACTERIA

(71) Applicant: MOFIN S.R.L., Novara (IT)

(72) Inventors: Giovanni Mogna, Novara (IT); Gian Paolo Strozzi, Novara (IT)

(73) Assignee: MOFIN S.R.L., Novara (IT)

( * ) Notice: Subject to any disclaimer, the term of this patent is extended or adjusted under 35 U.S.C. 154(b) by 0 days.

(21) Appl. No.: 15/539,667

(22) PCT Filed: Dec. 28, 2015

(86) PCT No.: PCT/IB2015/060009
§ 371 (c)(1),
(2) Date: Jun. 23, 2017

(87) PCT Pub. No.: WO2016/108173
PCT Pub. Date: Jul. 7, 2016

(65) Prior Publication Data
US 2017/0367353 A1   Dec. 28, 2017

(30) Foreign Application Priority Data

Dec. 29, 2014   (IT) .......................... 102014902319435

(51) Int. Cl.
*A21D 8/04* (2006.01)
*A21D 13/41* (2017.01)

(52) U.S. Cl.
CPC ............. *A21D 8/045* (2013.01); *A21D 13/41* (2017.01)

(58) Field of Classification Search
None
See application file for complete search history.

(56) References Cited

U.S. PATENT DOCUMENTS

| | | | |
|---|---|---|---|
| 7,175,865 B2 | 2/2007 | Lonergan | |
| 9,386,777 B2 | 7/2016 | Giuliani et al. | |
| 2005/0042332 A1* | 2/2005 | Lonergan | A21D 2/186 426/94 |
| 2015/0132270 A1* | 5/2015 | Benfeldt | C12R 1/25 424/93.45 |
| 2016/0051600 A1 | 2/2016 | Martin Del Campo Lopez et al. | |

FOREIGN PATENT DOCUMENTS

| | | |
|---|---|---|
| CN | 1968610 A | 5/2007 |
| CN | 102655756 A | 9/2012 |
| CN | 103315015 A | 9/2013 |
| DE | 102010048082 A1 | 4/2012 |
| EA | 015575 B1 | 10/2011 |
| JP | S58205450 A | 11/1983 |
| JP | 2004533442 A | 11/2004 |
| JP | 2006158382 A | 6/2006 |
| JP | 2007507526 A | 3/2007 |
| JP | 2010534470 A | 11/2010 |
| JP | 2011520821 A | 7/2011 |
| JP | 2011254773 A | 12/2011 |
| JP | 2013521335 A | 6/2013 |
| JP | 2013209396 A | 10/2013 |
| JP | 2014512376 A | 5/2014 |
| KR | 20120020926 A | 3/2012 |
| RU | 2409034 C1 | 1/2011 |
| WO | 00/04782 A1 | 2/2000 |
| WO | 02/091833 A1 | 11/2002 |
| WO | 2005/032591 A1 | 4/2005 |
| WO | 2006/097415 A1 | 9/2006 |
| WO | 2009/013709 A2 | 1/2009 |
| WO | 2009/138300 A1 | 11/2009 |
| WO | 2011/110918 A1 | 9/2011 |
| WO | 2012/143787 A1 | 10/2012 |
| WO | 2014/148881 A1 | 9/2014 |
| WO | 2016/108173 A1 | 7/2016 |

OTHER PUBLICATIONS

Bee's Adventures "Lactose Free Mozzarella Cheese" Oct. 13, 2011 https://beesadventures.wordpress.com/2011/10/13/lactose-free-mozzarella-cheese/ (Year: 2011).*
Nakamura JP 2006-158382 Jun. 2006 Translation pp. 1-34 (Year: 2006).*
Cornell University "Dairy foods Science Notes" https://foodsafety.foodscience.cornell.edu/sites/foodsafety.foodscience.cornell.edu/files/shared/documents/CU-DFScience-Notes-Dairy-Cultures-HomoHeteroferm-10-08.pdf (Year: 2008).*
You et al. KR 20040093334 Derwent Abstract pp. 1-2 (Year: 2004).*
Bastetti G "Breads Produced in Italy Part II: Bread Formulas and Production" Technical Bulletin/Research Department, American Institute of Baking, US, vol. 23, No. 9, Sep. 1, 2001, pp. 1-08.
International Search Report and Written Opinion for PCT/IB2015/060009 filed on Dec. 28, 2015 on behalf of MOFIN S.R.L. dated Apr. 12, 2016. 12 pgs.
Ottogalli G et al. "Italian Bakery Products Obtained with Sour Dough: Characterization of the Typical Microflora" Advanced in Food Sciences (CMTL), Technische Universitaet Muenchen, Muenchen, DE, vol. 18, No. 5/06, Jan. 1, 1996, pp. 131-144.
International Preliminary Report on Patentability for PCT/IB2015/060009 filed Dec. 28, 2015 on behalf of MOFIN S.R.L. dated Jul. 4, 2017. 7 pages.
Lee, Y.K et al., Excerpt of "Handbook of Probiotics and Prebiotics", Second Edition, 2009, John Wiley & Sons, Inc., Hoboken, New Jersey, p. 399. Total of 3 pages.

(Continued)

*Primary Examiner* — Felicia C Turner

(74) *Attorney, Agent, or Firm* — Steinfl + Bruno LLP

(57) ABSTRACT

A yeast-free, highly digestible pizza and a method for the production of said yeast-free pizza by using a dough containing selected lactic acid bacteria are described. The use of one or more strains of lactic acid bacteria for leavening a dough comprising water, flour, salt and other ingredients intended for preparing pizzas to be frozen and thawed before their consumption is also described.

10 Claims, No Drawings

(56) References Cited

OTHER PUBLICATIONS

Wikipedia.org. "Lactobacillus". Downloaded on Dec. 26, 2018, with last update on Dec. 19, 2018, and the related excerpt filed with the response on Dec. 26, 2018. 13 pages. https://en.wikipedia.org/wiki/Lactobacillus.
Italian Wikipedia.org. "Lactobacillus". Downloaded on Dec. 27, 2018, with last update on Apr. 28, 2018, and the related excerpt filed with the response on Dec. 26, 2018. 9 pages. English translation using Google Translate. https://it.wikipedia.org/wiki/Lactobacillus.
Briczinski E.P. et al. "Strain-Specific Genotyping of *Bifidobacterium animalis* subsp. lactis by Using Single-Nucleotide Polymorphisms, Insertions, and Deletions", Applied and Environmental Microbiology, vol. 75, No. 23, Dec. 2009, pp. 7501-7508.
Office Action for Russian Application No. 2017123970 filed on Dec. 28, 2015, dated Jun. 3, 2019. Russian and English translation. 11 pages.
Search Report for Russian Application No. 2017123970 filed on Dec. 28, 2015, dated Jun. 3, 2019. Russian and English translation. 4 pages.
Decision to Grant for RU2017123970/13 filed on Dec. 28, 2015, dated Feb. 20, 2020. Russian + English translation. 12 pages.
Makarova, K. et al. "Comparative genomics of the lactic acid bacteria", PNAS, vol. 103, No. 42, Oct. 17, 2006, p. 15611-15616.
Merriam-Webster Medical Dictionary, Medical Definition "Homofermentative" Downloaded Feb. 5, 2020. 1 page.
Merriam-Webster Medical Dictionary, Medical Definition: "Heterofermentative". Downloaded Feb. 5, 2020. 1 page.
Official Action for Japanese Application No. 2017-552538, dated Oct. 1, 2019. 7 pages. (English + Japanese translation).
Tatebe, J et al. "Uremic Toxin and Endothelium" Journal of Analytical Bio-science (2012) vol. 35, No. 3, pp. 191-200. (English Summary).
Wikipedia "Lactobacillus". Downloaded on Feb. 24, 2020, with last update on Feb. 20, 2020. 17 pages. https://en.wikipedia.org/wiki/Lactobacillus.
Chinese Office Action for Chinese Application No. 201580071048.4 filed on Dec. 28, 2015 on behalf of MOFIN S.R.L. dated Mar. 5, 2020. 10 pages. Chinese + English.
Chinese Search Report for Chinese Application No. 201580071048.4 filed on Dec. 28, 2015 on behalf of MOFIN S.R.L. dated Feb. 21, 2020. 4 pages. Chinese + English.
Chinese Second Office Action for Chinese Application No. 201580071048.4 filed on Dec. 29, 2014 on behalf of MOFIN S.R.L. dated Aug. 12, 2020. 12 pages. Chinese with Eng trans.
First Examination Report for Indian Application No. 201747024338 filed on Jul. 11, 2017 on behalf of MOFIN S.R.L. dated Feb. 25, 2021. 6 pages.
Notice of Allowance for Chinese Application No. 201580071048.4 filed on Dec. 29, 2014 on behalf of MOFINS.R.L. dated Mar. 18, 2021. 5 pages. Chinese original + English translation.

\* cited by examiner

PRODUCTION OF A YEAST-FREE, HIGHLY DIGESTIBLE PIZZA BY USING A DOUGH CONTAINING LACTIC ACID BACTERIA

CROSS-REFERENCE TO RELATED APPLICATIONS

The present application is the U.S. National Stage of International Patent Application No. PCT/IB2015/060009 filed on Dec. 28, 2015 which, in turn, claims priority to Italian Patent Application No. 102014902319435 filed on Dec. 29, 2014.

The present invention relates to a yeast-free, highly digestible pizza. Furthermore, the present invention relates to a method for the production of said yeast-free pizza by using a dough containing selected lactic acid bacteria. Finally, the present invention relates to the use of one or more strains of lactic acid bacteria for leavening a dough comprising water, flour, salt and other ingredients intended for preparing pizzas to be frozen and thawed before their consumption.

The pizza is prepared by using a dough based on water, flour, salt and yeast. The yeast ensures the so-called "leavening", namely the increase in volume of the dough due to the production of carbon dioxide by the microorganisms present in the yeast itself. Thus far, two different kinds of yeast are used: the natural one, also referred to as sourdough, mother dough or biga and the brewer's yeast, often known as compressed yeast or dry yeast.

The natural yeast consists of a mixture of water and flour allowed to spontaneously "maturing", that is fermenting by a complex of yeasts and lactic acid bacteria naturally occurring in the flour itself. More often, the natural yeast is obtained by triggering the fermentation with some mature dough deriving from a previous batch. This is the technique still used of the so-called "refreshing" by which, basically, fresh flour and further water is added to a previously prepared sourdough. The flour most frequently used for preparing the sourdough is from either hard or soft wheat.

There is also the so-called brewer's yeast consisting of a microscopic unicellular fungus belonging to the species *Saccharomyces cerevisiae*, which is able to leavening the dough, within short and even periods of time, producing in a short time, a high amount of carbon dioxide which, being entrapped in the gluten meshes of the dough, causes the increase in volume by forming the so-called alveolation.

The brewer's yeast is able to produce within short periods of time, and in a very wide range of temperature, high amounts of $CO_2$, ensuring a proper leavening even in the presence of weak flours (with a low content of gluten) and thus less expensive.

For these reasons, in the last decades, the brewers yeast (compressed yeast) almost completely replaced the use of sourdoughs (natural yeast), leading to a dramatic impoverishment of the structural and sensory variability of the bakery products. The increasing need for a fast leavening resulted in the use of increasing amounts of brewer's yeast until to fully replace the contribution of the lactic acid fermentation.

*Saccharomyces cerevisiae* instead of complement the lactic acid bacteria naturally occurring in the flour or added with the sourdough and thus integrate the metabolism thereof, assisting the formation of the alveolation due to the production of $CO_2$, when added at high dosages to the dough of water and flour, clearly prevails over the lactic flora thus becoming the only fermenting microorganism.

Initially, *Saccharomyces cerevisiae* performs the aerobic respiration by using the $O_2$ dispersed in the dough in order to break down sugars with a release of $CO_2$ and heat; then, when the oxygen is depleted, it turns to the alcoholic fermentation exploiting the energy of the sugars for producing ethyl alcohol and additional $CO_2$.

Actually, since the flour does not contain free sugars which could serve as a substrate for fermentation, the starch of the flour is required to be previously hydrolyzed by endogenous amylases to maltose and the latter is further cleaved into two molecules of glucose by means of endogenous enzymes from the flour or produced by *Saccharomyces* itself.

As soon as the glucose is available in the substrate, the yeast, at first in the presence of oxygen, converts it to carbon dioxide, water and heat and then, when the oxygen is depleted, converts it to alcohol and further dioxide responsible for the increase in the dough volume. The produced amount of $CO_2$ is of about 3.5 ml/g of dough.

As well as all the other yeasts, *Saccharomyces cerevisiae* does not produce substantial amounts of organic acids, just giving rise to small amounts of carboxylic acids and esters thereof which affect, although marginally, the taste of the final product. The release of glutathione assists the reduction, at the end of the leavening, of the gluten S—S bonds, thus modifying the rheological properties of the dough, which becomes more suitable for the subsequent baking step.

Table A below shows the main metabolic differences between *Saccharomyces cerevisiae* (brewer's yeast) and sourdough (natural yeast). It is important to note the substantial difference in the production of organic acids, a property which deeply affects the rheological, sensory and nutritional characteristics of the products prepared with the two different yeasts.

TABLE A

| Characteristics | Natural yeast | Brewer's yeast |
|---|---|---|
| pH | 3.8-4.6 | 5.3-5.8 |
| Lactic acid | 0.4-0.8% | 0.005-0.04% |
| Acetic acid | 0.10-0.40% | 0.005-0.04% |
| Staling | Slow | Fast |
| Microbiological preservation | Good protection against contaminations | Sensitive to the activity of bacteria and molds |
| Nutritional aspects | Optimal activity of phytases and degradation of phytic acid responsible for the formation of complexes with some ions<br>Increase in the concentration and bioavailability of free aa<br>Increase in the concentration of phenolic substances with antioxidant effect<br>Higher solubility of the fiber<br>Reduction in the values of glycemic index | Reduced activity of phytases, decalcifying effect<br>Concentration of free aa similar to flour |

In the last decades, in order to providing products with characteristics similar to those obtained with the natural yeast and the refreshing technique, products defined "Mother Doughs" of Type I, Type II and Type III were introduced in the market.

Doughs prepared with mother dough also require, for the purposes of a proper and complete leavening, the presence of a part of brewer's yeast (*Saccharomyces cerevisiae*) which is added during kneading in order to ensure the production of an amount of carbon dioxide sufficient to guarantee a proper and complete leavening.

It is well known that in the last years there has been an alarming increase of subjects intolerant to yeast, that is individuals which, after eating a series of yeast-fermented foods, in particular by brewer's yeast, experience a feeling of bloating, meteorism, flatulence, heaviness and headache.

This is an adverse reaction of the body, which, as well as all the other food intolerances, does not involve the immune system. The disorders can mainly affect the gastrointestinal system with halitosis, stomach cramps, constipation, diarrhea and attacks of colitis. In some cases, inflammations of the respiratory tracts can occur with rhinitis, sneezing, asthma, skin rashes, often with itching. In the most severe cases, metabolic imbalances develop with exhaustion and loss of weight.

In few subjects the reactivity can be triggered by all the fermented foods, but usually it concerns foods prepared with brewer's yeast (*Saccharomyces cerevisiae*) such as for example bread, pasta, pizza, pastries and leavened sweets (panettone, pandoro).

Thus far, no microorganism cultures, which do not require compressed brewer's yeast for the leavening are commercially available.

All the kinds of products used in the final dough for ensuring the maturation/leavening thereof, both natural (natural yeast being refreshed with variable frequency in the single bread-making unit) and commercial (mother doughs Type I, II and III) contain and/or require the addition of compressed brewer's yeast.

It follows that all the leavened bakery products, including the pizza, are made with the help of yeasts intentionally added in any steps of the process, usually during the preparation of the final dough. The yeasts of natural sourdoughs belong to different genera and species, whereas those being added consist of *Saccharomyces cerevisiae*.

Therefore, there is the need, from the operators in this field and consumers, to be able to leaven a dough for bakery products, such as for example the pizza, without resorting in any way to the use of yeast (*Saccharomyces cerevisiae*, or other species) so that to avoid all the limits and drawbacks deriving from the use thereof.

In the light of all the problems deriving from the use of yeast, it is desirable to have a new method for leavening pizza doughs comprising water, flour, salt and other ingredients, only through the heterolactic fermentation (production of both organic acids (lactic and acetic acids) and carbon dioxide) which is able to ensuring a proper and complete leavening of the dough and, at the same time, a pizza which can be baked (partly or totally), frozen and thawed in the oven while maintaining unchanged all the characteristics typical of a freshly made and just served pizza.

The Applicant, after a long and intense research and development activity, developed a method for leavening pizza doughs, without the use of yeast (*Saccharomyces cerevisiae*, or other species), being able to suitably meet the above-cited needs.

It is an object of the present invention a yeast-free (*Saccharomyces cerevisiae*, or other species), highly digestible pizza, having the characteristics as claimed in the appended claims.

It is another object of the present invention a method for the production of said yeast-free (*Saccharomyces cerevisiae*, or other species), highly digestible pizza, having the characteristics as claimed in the appended claims.

It is another object of the present invention the use of one or more strains of lactic acid bacteria for leavening a dough comprising water, flour and other ingredients intended for preparing pizzas to be frozen and thawed before their consumption.

Preferred embodiments of the present invention are described in detail below, without intending to limit in any way the scope of the present invention.

The Applicant found that a particular combination of facultative and obligatory heterofermentative lactobacilli is a complete biochemical system being able to produce, from simple sugars and flour starch, both the organic acids essential for an optimal maturation (as the traditional natural yeasts do) and carbon dioxide (as the brewer's yeast does), required in the leavening for the formation of a finely distributed alveolation.

The Applicant, following to an extended and long research and development activity, succeeded to detect and isolate a selected group of strains of heterofermentative lactic acid bacteria capable to producing, without the presence of yeast (*Saccharomyces cerevisiae*, or other species), high amounts of $CO_2$ within relatively short periods of time, thus able to leaven a pizza dough in a proper and complete manner. The selected strains of lactic acid bacteria are able to exert their leavening activity within a very wide range of temperature comprised from 15° C. to 30° C., thereby allowing the dough to mature at room temperature without the use of particular thermoregulatory devices.

The strains of bacteria selected by the Applicant, being used either individually or preferably as a mixture thereof, are in fact able to produce in a dough comprising flour, water, salt and any other ingredients, amounts of carbon dioxide similar to those produced by the brewers yeast, within periods of time ranging from few tens of minutes to some hours depending on the application modes, neither more nor less than what occurs with the brewer's yeast.

In addition to carbon dioxide, the strains of lactic acid bacteria of the present invention also produce organic acids, which confer to the pizza dough very advantageous rheological proprieties from a technological point of view and organoleptic and nutritional characteristics well appreciated by the consumer.

The strains of heterofermentative lactic acid bacteria of the present invention which were isolated, characterized and considered able to ensure in the pizza dough both the production of organic acids (lactic and acetic acids) and carbon dioxide, replacing in toto the leavening thus far carried out with brewer's yeast (*Saccharomyces cerevisiae*, or other species) were all deposited at the DSMZ Institute in Germany, which adhered to the Budapest Treaty.

The strains of lactic acid bacteria of the present invention are selected from the group comprising or, alternatively, consisting of:

| | | |
|---|---|---|
| a. *Lactobacillus plantarum* LP10 | ID 1899 | DSM 29389 |
| b. *Lactobacillus plantarum* LP11 | ID 1900 | DSM 29390 |
| c. *Lactobacillus plantarum* LP12 | ID 1901 | DSM 29400 |
| d. *Lactobacillus plantarum* LP13 | ID 1902 | DSM 29401 |
| e. *Lactobacillus brevis* LBR02 | ID 1905 | DSM 29404 |
| f. *Lactobacillus routeri* LRE10 | ID 1904 | DSM 29403 |
| g. *Leuconostoc* spp. LM01 | ID 1864 | DSM 29372 |
| h. *Leuconostoc* spp. LM10 | ID 1865 | DSM 29373 |
| i. *Leuconostoc* spp. LM11 | ID 1866 | DSM 29374 |
| j. *Leuconostoc* spp. LM12 | ID 1867 | DSM 29375 |

It is an object of the present invention a composition comprising or, alternatively, consisting of all the strains of lactic acid bacteria from (i) to (j) in varying weight proportions with each other, intended for preparing pizzas to be baked (partly or totally), frozen and then thawed before their consumption. Preferably said composition can further comprise flour, salt and other ingredients.

In a preferred embodiment, the yeast-free pizza of the present invention contemplates the use of a lactose-free mozzarella or stretched curd cheese in order to enhance the digestibility of the pizza obtained with the use of the strains of lactic acid bacteria of the present invention. Furthermore, the use of a lactose-free mozzarella or stretched curd cheese allows to preparing a pizza which can be baked, frozen and, subsequently, thawed while maintaining unchanged all the characteristics typical of a freshly made and fresh from the oven pizza. In fact in this case the absence of lactose prevents the formation of lactose crystals, following to thawing, giving rise to a pizza with an unchanged palatability after thawing. Thus, it is possible to prepare a yeast-free and lactose-free pizza. Furthermore, since the mozzarella is obtained with the use of inulin, a valuable and highly digestible fiber is present.

It is an object of the present invention also the use of one or more (or all) of said strains of lactic acid bacteria for leavening a dough comprising water, flour, salt and other ingredients intended for preparing pizzas to be baked (partly or totally), frozen and then thawed before their consumption.

The above-cited strains of facultative (*L. plantarum* and *L. curvatus*) or obligatory (*L. brevis, L. reuteri* and *Leuconostoc* spp.) heterofermentative lactic acid bacteria can be used either individually or in any mixture deriving from the various possibilities of combination, for preparing doughs intended for the production of several kinds of pizza.

The preferred physical form of use of the strains of lactic acid bacteria of the present invention is that dehydrated by freeze-drying, a way which keeps the bacterial cell under a proper physiological condition, that is live, completely viable and ready to develop as soon as it is contacted with the nutrient substrate consisting of water and flour.

In order to best standardizing the various bacterial cultures to be offered to the clientele, preserving the possibility for modifying the composition of the formulation depending on the specific needs and/or the quality of the raw material, the strains are individually produced by fermentation, then concentrating the bacterial biomass which, after a proper cryoprotection, is freeze-dried.

The single batches of concentrated, freeze-dried strains of the present invention, after careful analyses for the bacterial purity, are subjected to the assessment of the fermentative activity in standardized substrates based on soft, hard wheat flour and mixture thereof at 50% (reference substrates).

The fermentative activities in the reference substrates are performed at controlled temperatures of 20°, 25° C. and 30° C. by inoculating known amounts of the freeze-dried strains, to which it corresponds a defined number of bacterial cells.

The parameters subjected to analytical determination are the production of organic acids, being assessed by measurement of the pH through a specific calibrated probe and the gas production being assessed in a closed container by measuring with a manometer the pressure increase induced by the build-up of $CO_2$. Depending on the fermentative and gas producing activity, each batch of lyophilizate is then dosed in order to ensure over time in the reference substrates given curves of acidification and $CO_2$ production, at different temperatures.

The Applicant prepared formulations of strains of selected heterofermentative lactic acid bacteria of the present invention such that to meet both the technological needs of the pizza (acidification and suitable production of $CO_2$) as well as of the pizza maker (fast periods of time).

The method of the present invention contemplates the preparation of a pre-dough (the so-called biga) to be then used, when the maturation is completed, in the preparation of the final dough, which gives rise to discs of dough to be topped and put in the oven.

The preparation of the biga should be performed at a temperature comprised between 16 and 34° C., preferably between 20 and 28° C. and even more preferably between 22 and 24° C.; depending on the temperature, the maturation time varies from 8 to 24 hours, preferably from 12 to 20 hours and even more preferably from 16 to 18 hours. Therefore, it should be scheduled for the day before that in which the final dough has to be prepared.

The percentage by weight of the biga relative to the weight of the final dough can vary from 30 to 80%, preferably from 50 to 70% and even more preferably from 60 to 66%, depending on the intended kind of pizza and the time of maturation of the final dough.

Next, starting from the preparation of the final dough and until the step of topping of the dough discs, prior to the oven baking, a period lasting from a minimum of 30-60 minutes up to 4-6 hours is required, depending on the desired rheological characteristics and the temperature of maturation/leavening.

In more detail, the preparation and maturation of the final dough consists of the following technological steps:

Refreshing of the biga with fresh flour, water, salt and any other ingredients thus obtaining a new dough, referred to as final dough. After kneading, the temperature of the new dough should be comprised between 20° C. and 32° C., preferably between 23° C. and 29° C. and even more preferably between 25° C. and 27° C.

Intermediate proofing of the final dough consisting in resting the dough itself in a single mass corresponding to the overall amount. This step is performed at the same temperatures as cited above, possibly in an environment with relative humidity of 70%-80%. It can variably last from 10 minutes to about 100 minutes, depending on the percentage of biga being used and the technological needs.

Dividing of the dough and forming of the dough balls which will constitute the base of the pizza. In the case of a round pizza, the average weight of each ball can vary from 150 to 300 g depending on the diameter and thickness of the desired disc of dough.

Leavening of the dough balls at a temperature comprised between 20° C. and 32° C., preferably between 23° C. and 29° C. and even more preferably between 25° C. and 27° C.

The increase in volume of the ball should be at least of 10-70% relative to the original volume, preferably 30-50%.

The length of the leavening step of the dough balls can vary from a minimum of 20-30 minutes to a maximum of 4-6 hours, preferably about 2-3 hours.

Laminating of the ball in a more or less thin layer. The leavened dough is stretched in the form of sheet by means of household (rolling pin) or industrial (rolls) tools. After the stretching in a given form (usually a disc), the dough should not shrink and return to its original size, namely, as those operating in the sector say "it should not have a memory effect".

After the maturation/leavening of the dough and the preparation of the disc of dough, the preparation of the pizza proceeds with the topping, traditionally (tomato sauce, mozzarella and basil) or according to personal imagination and tastes.

After topping, the pizza is ready to be baked, preferably in a wood oven at a temperature of 400-450° C. for 3-4 minutes, or in an electric oven at 250-300° C. for about 12-15 minutes.

The equipment used by the Applicant for developing all the objects of the present invention, namely a yeast-free, highly digestible pizza, a method for preparing the same and the use of selected strains of lactic acid bacteria for leavening the dough, was of semi-industrial type by using, for the kneading, a planet mixer with dipping arms, whereas for maturing both the biga and the final doughs, thermostatic cells with controlled temperature and humidity were employed and finally, for the baking, an electric oven with a refractory surface was used.

Several formulations of the selected heterofermentative strains being object of the present invention were tested at different dosages (Colony Forming Units [CFU]/kg of flour) for preparing the biga allowed to mature under variable conditions of temperature and time.

The obtained biga, after maturation, was thus "refreshed" with additional water, flour, salt and some olive oil, according to the traditional recipe of the Neapolitan pizza.

At the end of maturation of the various final doughs, the stretching thereof was performed in the form of discs which, after the addition of tomato sauce, mozzarella and basil, were put in a oven at a temperature of about 300° C. for 8-10 minutes.

For each test group of the heterofermentative strains, the comparison with the brewer's yeast (REFERENCE) was always included.

The doughs at the end of maturation and the pizzas after baking were assessed in blind from groups of people, usually not less than ten members per group. The opinions took into account the following parameters:

A) Dough at the end of maturation/leavening
i) Acidity (by the production of lactic and acetic acids) by measurement of the pH.
ii) Increase in the volume (by the production of carbon dioxide) between the dough immediately after the kneading and at the end of maturation.
iii) Homogeneity and distribution of the alveolation.
iv) Extensibility and plasticity (strength and workability of the gluten network) without tears and/or cracks.
v) Memory effect (shrinkage of the stretched dough).
vi) Organoleptic characteristics of the raw dough (taste and aromatic compounds).

B) Pizzas after baking
i) Palatability and overall pleasantness.
ii) Homogeneity and distribution of the alveolation and presence of too large bubbles and cavities, if any, weakness index of the gluten network.
iii) Crispness and fragrance, particularly of the border, even after cooling.
iv) Impermeability of the dough at the center of the pizza where problems of poor baking can occur due to an excess of humidity from the tomato puree and/or mozzarella.
v) Color of the border, which should appear homogeneous and golden brown.
vi) Taste and flavor of both the topped and outer, without topping parts.
vii) Speed of cooling.
viii) Staling and chewiness.
ix) Digestibility expressed after tasting the pizza both fresh from the oven and after cooling at room temperature.

Based on the different performed tests the formulations were selected, exclusively based on the selected heterofermentative strains, which provided the best results as regards the rheological quality of the dough and pizza and the digestibility thereof.

By way of mere example, it is described a preferred composition of a formulation (Formulation G—Table B) particularly appreciated by the group of testers for: (i) the rheological quality of the produced doughs (biga and final), (ii) the palatability of the pizza and the high digestibility thereof, (iii) the constancy of performances (acidification, production of $CO_2$ and aromatic compounds) as well as (iv) the ability to provide a pizza which, once baked (partly), frozen and subsequently thawed before its use, maintains the taste and consistency properties typical of a freshly made and fresh from the oven pizza.

TABLE B

| | Formulation G | | | |
|---|---|---|---|---|
| | Bacterial species | ID abbreviation | Amount in millions (CFU)/kg of BIGA | Type of fermentation |
| a | *Lactobacillus plantarum* | ID 1899 DSM 29389 | 40 | Hetero-facultative |
| b | *Lactobacillus plantarum* | ID 1900 DSM 29390 | 40 | Hetero-facultative |
| c | *Lactobacillus plantarum* | ID 1901 DSM 29400 | 40 | Hetero-facultative |
| d | *Lactobacillus plantarum* | ID 1902 DSM 29401 | 40 | Hetero-facultative |
| e | *Lactobacillus brevis* | ID 1905 DSM 29404 | 250 | Hetero-obligatory |
| f | *Lactobacillus reuteri* | ID 1904 DSM 29403 | 650 | Hetero-obligatory |
| g | *Leuconostoc* spp. | ID 1864 DSM 29372 | 200 | Hetero-obligatory |
| h | *Leuconostoc* spp. | ID 1865 DSM 29373 | 100 | Hetero-obligatory |
| i | *Leuconostoc* spp. | ID 1866 DSM 29374 | 600 | Hetero-obligatory |
| j | *Leuconostoc* spp. | ID 1867 DSM 29375 | 100 | Hetero-obligatory |

Said preferred formulation (Formulation G), as well as all the other available ones, can be pre-dosed for preparing different amounts of biga and final dough.

In the tables below, possible preferred dosages for preparing the pizza in three different locations are exemplified: Home, Pizzeria, Bakery industry.

Since in the field of bakery all the parameters are usually related to the amount of flour instead of the overall amount of dough, in Table 1 such a convention was applied by relating the dosages of formulation G to the kg of flour to be used for preparing the biga.

TABLE 1

Formulations G for preparing PIZZA at Home, Pizzeria and Industry

| FORMULATION abbreviation | Amount (kg) of flour to be used for the BIGA | Amount (kg) of FINAL DOUGH | No. of pizzas of 230 grams |
|---|---|---|---|
| G 0.2 HOME | 0.2 | 0.47 | 2 |
| G 0.5 HOME | 0.5 | 1.17 | 5 |
| G 3 PIZZERIA | 3.0 | 7.00 | 30 |
| G 5 PIZZERIA | 5.0 | 11.66 | 50 |
| G 100 INDUSTRY | 100 | 233.2 | 1.014 |
| G X INDUSTRY Dosed as needed | X | depending on industry needs | |

In the examples of Table 1, the percentage by weight of the biga relative to the weight of the final dough is of 63.83%, a very advantageous, but definitely not exclusive and/or crucial combination for a successful refreshing.

Table 2 shows a very advantageous, but definitely not unique recipe for preparing the biga with reference to the different dosages of formulation G (described in Table 1).

TABLE 2

Recipes for preparing the BIGA

| Ingredients Formulation G (one packet) | G 0.2 | G 0.5 | G 3 | G 5 | G 100 |
|---|---|---|---|---|---|
| Flour (with high gluten %, e.g. strength 300 W) | 200 | 500 | 3 | 5 | 100 |
| Water | 100 | 250 | 1.5 | 2.5 | 50 |
| Total Biga dough | 300 | 750 | 4.5 | 7.5 | 150 |
| Legend | Amounts in grams | | Amounts in kilograms | | |

In Table 3 a very advantageous, but definitely not unique recipe for preparing the final doughs is shown, relative to the different dosages of formulation G (described in Table 1).

TABLE 3

Recipes for preparing the FINAL DOUGH

| Formulation G | G 0.2 | G 0.3 | G 3 | G 5 | G 100 |
|---|---|---|---|---|---|
| Ingredients | | | | | |
| BIGA | 300 | 750 | 4.5 | 7.5 | 150 |
| Flour (with high gluten %, e.g. strength 300 W) | 100 | 250 | 1.5 | 2.5 | 50 |
| Olive oil (corn, peanuts, sunflower) | 3 | 7.5 | 45 | 75 | 1.5 |
| Salt | 6 | 15 | 90 | 150 | 3.0 |
| Malt (not essential) | 1.5 | 3.8 | 22.5 | 37.5 | 0.75 |
| Water | 56 | 140 | 0.84 | 1.40 | 28.0 |
| Total final dough | 466 | 1.166 | 7.0 | 11.66 | 233.2 |
| Number of pizzas of 230 grams | 2 | 3 | 30 | 50 | 1.014 |
| Legend | Amounts in grams | | Amounts in kilograms | | |

The production cycle of the pizza with the cultures of heterofermentative lactobacilli being object of the present invention (hereinafter referred to as formulation G) contemplates the two classic steps of the bread-making tradition:
1. Preparing the biga by using water, flour and one dose of formulation G.
2. Preparing the final dough, by refreshing the biga prepared in item 1. with additional water, flour, salt, malt and oil.

A preferred embodiment for preparing the biga is described below.

In order to determine the abbreviation of formulation G to be used, it is required to establish the number of pizzas to be prepared from each dough and verify in Table n. 1. the corresponding abbreviation. Once the abbreviation of formulation G is determined, suitable for the specific needs, it is possible to obtain from Table n. 2. the recommended recipe for preparing the biga by following the directions below:

a. Use water at a temperature such that when the dough is ready, the temperature thereof is of about 23° C.

b. Knead in a planet mixer the ingredients of the recipe for about 3 minutes under low speed and further 2 minutes under high speed.

c. Allow the biga to mature for about 16-20 hours in an environment with relative humidity of 75-80% at a temperature of about 23° C.

When a proofer is not available, it is convenient to cover the biga dough with a damp towel and place it in a plastic lidded container so that to avoid an excessive dehydration resulting in the formation of a crust. The container should be stored in a room with a temperature close to 23° C.

A preferred embodiment for preparing the final dough is described below.

When maturation is completed, the biga can be immediately used for preparing the final dough, or stored in a refrigerator for a maximum of 2-3 days. For preparing the final dough use preferably the recipes of Table 3.

a. Use water at a temperature such that, when the dough is ready, the temperature thereof is of about 26° C.
b. Knead in a planet mixer the ingredients of the recipe for 2-4 minutes under low speed and additional 1-2 minutes under high speed.
c. Allow the dough to rest in a tank for 1-1.5 hours (intermediate proofing step).
d. Proceed with dividing and forming the balls of about 230 grams.
e. Allow the dough to mature in the form of balls for further 1.5-2 hours in a proofer at a temperature of about 26° C. and relative humidity of 70-80%.

When the maturation of the dough balls occurs at room temperature and under not controlled humidity, it is convenient to place the balls inside plastic lidded containers so that to avoid an excessive dehydration resulting in the formation of a crust. The containers should be stored in a room with a temperature close to 26° C. The maturation at a temperature of 22-23° C. requires a bit longer period, but it is feasible.

It is recommended to do not mature the dough at temperatures greater than 26° C. for avoiding an excessive acidification and demineralization of the gluten network with a consequent floppy dough. The formation of carbon dioxide and, thus, the alveolation would also result quantitatively lower.

The characteristics of the dough at the end of maturation are as follows: pH comprised between 4.40 and 4.80; the volume of the dough should increase by 30-50% relative to the original volume.

After maturation, the balls can be: immediately used for the subsequent steps of stretching and topping; or stored at room temperature for a maximum of some hours; or stored in a refrigerator for a maximum of 3-4 days and brought back to room temperature few hours before the use.
f. When it is needed, proceed with the stretching (lamination) of the balls in the form of disc or based on the baking tray.
g. Top as desired.
h. Bake in the oven, possibly with refractory bricks, at a temperature of about 300° C. for 8-10 minutes or in a home oven at 250-280° C. for 12-15 minutes.

A preferred embodiment relates to pizzas to be deep-frozen. When pizzas have to be deep-frozen, the baking should last as short as 1-2 minutes, preferably in a continuous oven with refractory bricks.

Another embodiment relates to home made pizzas. When a home oven (electric or gas) is used, it is convenient to perform the baking in two steps, with empty oven previously brought to a temperature of 250° C. In the first baking step the pizza with only the basic topping (tomato if red, or oil if white) is put in the pre-heated oven at 250° C. for about 8-10 minutes. After removing the baking tray from the oven and rapidly completing the desired topping, proceed with the second baking step for additional 3-5 minutes (depending on the topping).

Some examples of preferred, but not limiting embodiments are described below.

Example 1

Home—Preparation of No. 2 Pizzas 1.1 Biga: prepare a biga by kneading 200 g of flour, a packet of formulation G 0.2 and 100 g (ml) of water, for a total of 300 g. The temperature at the end of the kneading should be of about 23° C. After maturation of the dough at about 23° C. for 16-20 hours, the biga is ready to be refreshed and thus converted with the additional ingredients to the final dough.

1.2 Final dough: Knead the 300 g of biga with 100 g of flour, 3 g of oil, 6 g of salt, 1.5 g of malt (optional) and 56 g (ml) of water for a total of 466 g. The temperature at the end of the kneading should be of about 26° C. After resting for about 1 hour, the dough can be divided into two parts proceeding with the maturation/leavening always at a temperature of about 26° C. for additional 2 hours. Thus proceed with the stretching of the dough into discs, top as desired and bake.

Ex. 2

Pizzeria—Preparation of No. 50 Pizzas 2.1 Biga: prepare a biga by kneading 5 kg of flour, a packet of formulation G 5 and 2.5 kg (I) of water, for a total of 7.5 kg. The temperature at the end of the kneading should be of about 23° C. After maturation of the dough at about 23° C. for 16-20 hours, the biga is ready to be refreshed and thus converted with the additional ingredients to the final dough.

2.2. Final dough: Knead the 7.5 kg of biga with 2.5 kg of flour, 75 g of oil, 150 g of salt, 37.5 g of malt (optional) and 1.4 kg (I) of water for a total of 11.66 kg. The temperature at the end of the kneading should be of about 26° C. After resting for about 1 hour, the dough can be divided into about 50 balls with a weight of 230 g/each, then proceeding with the maturation/leavening always at a temperature of about 26° C. for further 2 hours. Thus proceed with the stretching of the balls into discs, top as desired and bake.

The advantages deriving from the use of the cultures being object of the present invention, relative to the use of any type of yeast, in particular brewer's yeast, are listed below.

From a technological point of view, the improvements concern the rheology of the dough during and at the end of maturation. Basically, it was observed:
1. Better texture with higher toughness, extensibility and strength of the gluten network which allows to better retain the carbon dioxide.
2. Easier workability of the dough.
3. Finer and evenly distributed alveolation.
4. Lack of "memory effect", that is, the dough does not shrink following to be stretched into a disc.
5. Increased shelf life of the dough at the end of maturation with consequent extension of the workability time and reduction of wastes. The formation (lamination) of the disc can be performed within some hours when the dough balls are stored at room temperature, or within some days when they are stored in a refrigerating room.
6. Higher impermeability of the dough, a characteristic particularly remarkable at the center of the disc where usually the most aqueous ingredients (tomato) concentrate, which could impregnate the dough leading to troubles of a proper baking relative to the outer parts.
7. Darker color of the crust of the pizza after baking, due to an enhanced Maillard reaction following to a higher production of free amino acids, as a consequence of a high proteolytic activity of bacterial enzymes.
8. Protective barrier effect against microbial contaminations, in particular molds, with a substantial extension of the shelf life of the final product.

From a nutritional point of view, the improvements are due to a series of crucial factors, such as:

1. The lack of brewer's yeast allows the pizza, prepared with the bacterial cultures being object of the present patent application, to be consumed even by subjects with yeast intolerance, unfortunately an always more common condition.
2. Higher protein digestibility due to the action of bacterial proteases.
3. Increase of the concentration and bioavailability of free amino acids.
4. Increase of the bioavailability of minerals such as iron, zinc, calcium and magnesium because of the degradation by bacterial phytases of phytates (complex chelated compounds of these ions with the phytic acid of the flour. Basically, lactobacilli eliminate this anti-nutritional factor.
5. Increase of the concentration of phenolic substances with antioxidant effect.
6. Higher solubility of the fiber with beneficial effects to the intestinal microbiota.
7. Reduction of the values of the postprandial glycemia.

From a rheological point of view it was observed:
1. Lack of the yeast taste and smell, given to the pizza by alcohol and other metabolites produced by *Saccharomyces cerevisiae*. The consumer is able to best appreciate the tastes/smells of the toppings used for garnish the pizza, characteristics no longer covered and masked by the taste of the yeast.
2. Greater palatability and overall pleasantness.
3. Homogeneous and evenly distributed alveolation without excessively large bubbles and cavities both in the border and in the dough of the topped part.
4. Higher crispness and fragrance of both the border and central parts, which can be appreciated even after the cooling of the pizza.
5. Slow cooling of the pizza, a characteristic which allows the consumer to better enjoy the pizza.
6. Less prominent staling and in any case never tending to be chewy.
7. Darker, homogeneous and golden brown color of the border due to an enhanced Maillard reaction following to a higher production of free amino acids, as a consequence of a high proteolytic activity of bacterial enzymes.
8. Captivating taste, with an intense and lasting aroma, due to the production of lactic, acetic acids and various pleasant metabolites by lactobacilli.
9. Pleasant smell due to the production of volatile aromatic compounds.
10. Extraordinary digestibility of the pizza both fresh from the oven and after cooling at room temperature.

From a commercial and management point of view, the following was observed:
1. The total lack of brewer's yeast represents a fundamental added value, being appreciated by most of the consumers.
2. The bacterial cultures being object of the present patent application allow to preparing a pizza with stable structural and sensory characteristics and a highly accepted palatability.
3. Reliable and standardizable times for the development of the bacterial cultures, both in the preparation of the BIGA and in the final refreshing, regardless of the fermentative aptitude of flours.
4. Possibility to best organizing and scheduling the work inside the company, pizzeria or home.
5. Lack of production wastes due to defects or over-maturation.
6. Essentially negligible incidence of costs/pizza.

The various formulations, consisting of one or more of the strains of heterofermentative lactobacilli being object of the present invention, are packed in convenient multi-layer (polyester, aluminum, polythene) single-dose packets for protecting the microbial culture from the environmental humidity. Each single-dose packet is for preparing the amount of biga and final dough corresponding to each abbreviation (see for example Table 1 in which the composition of formulation G, comprising all the selected strains at given numerical ratios, is detailed). The formulation packets should be stored in a refrigerator until the use, at a temperature of less than 5° C. and away from humidity, air and light. The product, when stored in the intact original packaging and under the conditions specified above, maintains its biological activity for at least 1 year from the date of packaging stated on the label.

It is an object of the present invention a method for preparing a yeast-free, highly digestible pizza, which comprises:
  preparing a pre-dough called biga comprising flour, water and any other ingredients, and one or more of the strains of bacteria selected from the group comprising or, alternatively, consisting of:

| | | |
|---|---|---|
| a. | *Lactobacillus plantarum* LP10 | ID 1899 DSM 29389 |
| b. | *Lactobacillus plantarum* LP11 | ID 1900 DSM 29390 |
| c. | *Lactobacillus plantarum* LP12 | ID 1901 DSM 29400 |
| d. | *Lactobacillus plantarum* LP13 | ID 1902 DSM 29401 |
| e. | *Lactobacillus brevis* LBR02 | ID 1905 DSM 29404 |
| f. | *Lactobacillus reuteri* LRE10 | ID 1904 DSM 29403 |
| g. | *Leuconostoc spp.* LM01 | ID 1864 DSM 29372 |
| h. | *Leuconostoc spp.* LM10 | ID 1865 DSM 29373 |
| i. | *Leuconostoc spp.* LM11 | ID 1866 DSM 29374 |
| j. | *Leuconostoc spp.* LM12 | ID 1867 DSM 29375 | allowing said pre-dough called biga to mature/leaven, due to the heterolactic fermentation performed by the above strains of lactic acid bacteria, to form a mature dough;
  performing a step called refreshing of the obtained mature dough, by using additional flour, water and any other ingredients, to form a complete final dough;
  allowing said complete final dough to mature/leaven;
  laminating, into layers of various height, part of said complete final dough to form a base of pizza dough to be topped for obtaining, after baking, the different kinds of pizza.

Preferably, in said method all the strains of bacteria are used together, in varying weight proportions with each other, for preparing a pre-dough called biga comprising flour, water and any other ingredients.

Preferably, said pizza obtained by said method is topped with lactose-free mozzarella or stretched curd cheese.

Preferably, in said method the use of yeast, brewer's yeast or *Saccharomyces cerevisiae*, or other species is never contemplated.

Preferably, said pizza prepared with said method is partly baked, frozen or deep-frozen and subsequently thawed, before the use by the final consumer.

It is an object of the present invention a yeast-free, highly digestible pizza obtained with said method.

It is an object of the present invention a food formulation comprising flour, and any other ingredients, and one or more of the strains of bacteria selected from the group comprising or, alternatively, consisting of:

| | | |
|---|---|---|
| a. | *Lactobacillus plantarum* LP10 | ID 1899 DSM 29389 |
| b. | *Lactobacillus plantarum* LP11 | ID 1900 DSM 29390 |
| c. | *Lactobacillus plantarum* LP12 | ID 1901 DSM 29400 |

-continued

| | | |
|---|---|---|
| d. | *Lactobacillus plantarum* LP13 | ID 1902 DSM 29401 |
| e. | *Lactobacillus brevis* LBR02 | ID 1905 DSM 29404 |
| f. | *Lactobacillus reuteri* LRE10 | ID 1904 DSM 29403 |
| g. | *Leuconostoc* spp. LM01 | ID 1864 DSM 29372 |
| h. | *Leuconostoc* spp. LM10 | ID 1865 DSM 29373 |
| i. | *Leuconostoc* spp. LM11 | ID 1866 DSM 29374 |
| j. | *Leuconostoc* spp. LM12 | ID 1867 DSM 29375 |

It is an object of the present invention the use of one or more strains of bacteria selected from the group comprising or, alternatively, consisting of:

| | | |
|---|---|---|
| a. | *Lactobacillus plantarum* LP10 | ID 1899 DSM 29389 |
| b. | *Lactobacillus plantarum* LP11 | ID 1900 DSM 29390 |
| c. | *Lactobacillus plantarum* LP12 | ID 1901 DSM 29400 |
| d. | *Lactobacillus plantarum* LP13 | ID 1902 DSM 29401 |
| e. | *Lactobacillus brevis* LBR02 | ID 1905 DSM 29404 |
| f. | *Lactobacillus reuteri* LRE10 | ID 1904 DSM 29403 |
| g. | *Leuconostoc* spp. LM01 | ID 1864 DSM 29372 |
| h. | *Leuconostoc* spp. LM10 | ID 1865 DSM 29373 |
| i. | *Leuconostoc* spp. LM11 | ID 1866 DSM 29374 |
| j. | *Leuconostoc* spp. LM12 | ID 1867 DSM 29375 | for leavening a yeast-free dough, comprising water, flour and any other ingredients intended for preparing a pizza to be baked, frozen and then thawed before its consumption.

Preferably, a formulation comprising or, alternatively, consisting of the formulation referred to as formulation G is used.

The invention claimed is:

1. A method for preparing a yeast free pizza, which comprises:

preparing a pre-dough comprising flour, water, heterofermentative bacterial strains:

| | | |
|---|---|---|
| k. | *Lactobacillus plantarum* LP10 | ID 1899 DSM 29389, |
| l. | *Lactobacillus plantarum* LP11 | ID 1900 DSM 29390, |
| m. | *Lactobacillus plantarum* LP12 | ID 1901 DSM 29400, |
| n. | *Lactobacillus plantarum* LP13 | ID 1902 DSM 29401, |
| o. | *Lactobacillus brevis* LBR02 | ID 1905 DSM 29404, |
| p. | *Lactobacillus reuteri* LRE10 | ID 1904 DSM 29403, |
| q. | *Leuconostoc* spp. LM01 | ID 1864 DSM 29372, |
| r. | *Leuconostoc* spp. LM10 | ID 1865 DSM 29373, |
| s. | *Leuconostoc* spp. LM11 | ID 1866 DSM 29374, and |
| t. | *Leuconostoc* spp. LM12 | ID 1867 DSM 29375, | allowing said pre-dough to mature/leaven, by means of heterolactic fermentation performed by the one or more of the strains of bacteria, to form a mature dough;
refreshing the mature dough to form a final dough;
allowing said final dough to mature/leaven;
laminating, into layers of variable height, part of said final dough to form a base of pizza dough to be topped for obtaining, after baking, different kinds of pizza.

2. The method according to claim 1, wherein the pizza is topped with lactose-free mozzarella or stretched curd cheese.

3. The method according to claim 1, wherein the pizza is free of yeast, brewer's yeast or *Saccharomyces cerevisiae*.

4. The method according to claim 1, wherein said prepared pizza is partly baked, frozen or deep-frozen and subsequently thawed, before to be used by the final consumer.

5. Food formulation comprising flour heterofermentative bacterial strains

| | | |
|---|---|---|
| k. | *Lactobacillus plantarum* LP10 | ID 1899 DSM 29389, |
| l. | *Lactobacillus plantarum* LP11 | ID 1900 DSM 29390, |
| m. | *Lactobacillus plantarum* LP12 | ID 1901 DSM 29400, |
| n. | *Lactobacillus plantarum* LP13 | ID 1902 DSM 29401, |
| o. | *Lactobacillus brevis* LBR02 | ID 1905 DSM 29404, |
| p. | *Lactobacillus reuteri* LRE10 | ID 1904 DSM 29403, |
| q. | *Leuconostoc* spp. LM01 | ID 1864 DSM 29372, |
| r. | *Leuconostoc* spp. LM10 | ID 1865 DSM 29373, |
| s. | *Leuconostoc* spp. LM11 | ID 1866 DSM 29374, and |
| t. | *Leuconostoc* spp. LM12 | ID 1867 DSM 29375. |

6. A method for leavening a yeast-free dough to be baked, frozen and then thawed before the consumption thereof, the method comprising preparing a formulation comprising heterofermentative bacterial strains

| | | |
|---|---|---|
| k. | *Lactobacillus plantarum* LP10 | ID 1899 DSM 29389, |
| l. | *Lactobacillus plantarum* LP11 | ID 1900 DSM 29390, |
| m. | *Lactobacillus plantarum* LP12 | ID 1901 DSM 29400, |
| n. | *Lactobacillus plantarum* LP13 | ID 1902 DSM 29401, |
| o. | *Lactobacillus brevis* LBR02 | ID 1905 DSM 29404, |
| p. | *Lactobacillus reuteri* LRE10 | ID 1904 DSM 29403, |
| q. | *Leuconostoc* spp. LM01 | ID 1864 DSM 29372, |
| r. | *Leuconostoc* spp. LM10 | ID 1865 DSM 29373, |
| s. | *Leuconostoc* spp. LM11 | ID 1866 DSM 29374, |
| t. | *Leuconostoc* spp. LM12 | ID 1867 DSM 29375, | and
mixing the formulation with flour and water to prepare the yeast-free dough.

7. The method according to claim 6, wherein the formulation comprises:
*Lactobacillus plantarum* LP10 at 40 million CFU/kg, *Lactobacillus plantarum* LP11 at 40 million CFU/kg, *Lactobacillus plantarum* LP 12 at 40 million CFU/kg, *Lactobacillus plantarum* LP 13 at 40 million CFU/kg, *Lactobacillus brevis* LBR02 at 250 million CFU/kg, *Lactobacillus reuteri* LRE10 at 650 million CFU/kg, *Leuconostoc* spp. LM01 at 200 million CFU/kg, *Leuconostoc* spp. LM10 at 100 million CFU/kg, *Leuconostoc* spp. LM11 at 600 million CFU/kg, and *Leuconostoc* spp. LM12 at 100 million CFU/kg, per kg of pre-dough for the yeast-free dough.

8. The method of claim 1, wherein the pre-dough comprise *Lactobacillus plantarum* LP10 at 40 million CFU/kg, *Lactobacillus plantarum* LP11 at 40 million CFU/kg, *Lactobacillus plantarum* LP 12 at 40 million CFU/kg, *Lactobacillus plantarum* LP 13 at 40 million CFU/kg, *Lactobacillus brevis* LBR02 at 250 million CFU/kg, *Lactobacillus reuteri* LRE10 at 650 million CFU/kg, *Leuconostoc* spp. LM01 at 200 million CFU/kg, *Leuconostoc* spp. LM10 at 100 million CFU/kg, *Leuconostoc* spp. LM11 at 600 million CFU/kg, and *Leuconostoc* spp. LM12 at 100 million CFU/kg, per kg of the pre-dough.

9. The method of claim 1, wherein the preparing the pre-dough is performed at a temperature between 16 and 34° C.

10. The method of claim 1, wherein the allowing said pre-dough to mature/leaven is performed in a time duration varying from 8 to 24 hours.

* * * * *